Dec. 10, 1946.                L. C. BIGGLE                2,412,490
                           FLUID CONTROL VALVE
                          Filed April 26, 1944
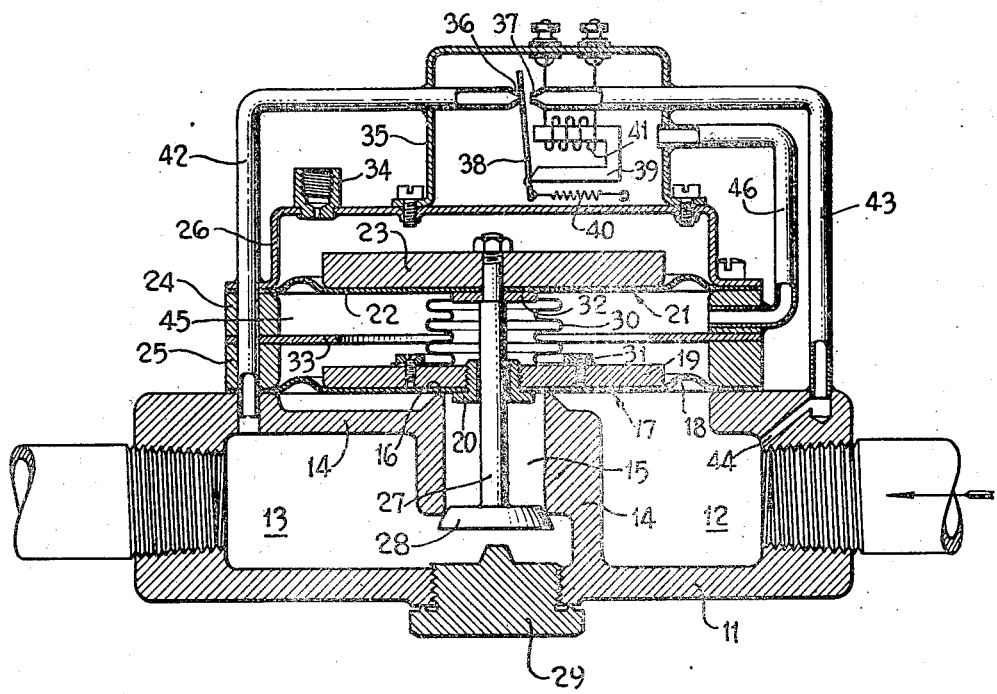
Inventor:
LAURENCE C. BIGGLE,
By
        John H. Rouse,
                    Attorney.

UNITED STATES PATENT OFFICE 2,412,490

FLUID CONTROL VALVE

Laurence C. Biggle, Altadena, Calif., assignor to General Controls Co., Glendale, Calif., a corporation of California Application April 26, 1944, Serial No. 532,795

5 Claims. (Cl. 137—144)

My present invention relates to fluid control devices, and more particularly to a combination diaphragm valve (operated by the pressure of the fluid controlled thereby) and fluid pressure regulator.

An object of the invention is to provide a device of the particular character described wherein the movable wall, or diaphragm, for operating the main valve closure and that for operating the regulator closure constitute walls of a common pressure chamber which, by pilot valve means, is selectively placed in communication with the inlet or with the outlet of the device to effect the desired control of fluid flow and pressure.

Another object is to provide a combination diaphragm valve and pressure regulator wherein variation of pressure drop across the main valve seat is compensated for by the regulator.

Another object is to compensate for the inlet pressure to which the regulator closure is exposed, by subjecting a portion of the regulator diaphragm to the inlet pressure, so that the regulator responds solely to the outlet pressure.

Other objects and advantages of the invention will be found in the description, the drawing, and the claims; and, for full understanding of the invention, reference may be had to the following detailed description and accompanying drawing, the single figure of which is a sectional view of a device embodying the invention.

In the drawing, the numeral 11 indicates a casing having an inlet chamber 12 and an outlet chamber 13 separated by a partition 14 having an elongated cylindrical port opening 15 therethrough; the material of the partition around the upper end of the port opening being raised to provide an annular valve seat 16. Covering an opening through the top wall of casing 11 is a first diaphragm member, generally indicated at 17 and comprising a diaphragm 18, of flexible and impermeable material such as treated leather, and a metal disk 19 which is secured to the diaphragm by a hollow screw 20. The diaphragm member 17 serves as a closure for the seat 16 and is biased into engagement therewith by the weight of disk 19.

Above the first diaphragm member 17 is a generally similar second diaphragm member 21 which comprises a flexible diaphragm 22, conveniently of leather, and a disk or weight 23. The diaphragm members are spaced apart by a pair of rings 24—25, disposed between the marginal portions of the diaphragms, and are secured by these portions to the top surface of the casing, with a cupped member 26 covering the upper diaphragm member. Secured to the upper diaphragm member 21 is a stem 27 which extends downwardly through the hollow of screw 20 and through the port opening 15 and is provided therebelow with a closure 28 cooperable with the edge of the bottom end of the port opening. In assembly, the stem 27 is introduced through an opening in the bottom wall of the casing which is then closed by a plug 29.

Sealingly joining the adjacent central portions of the diaphragm members is an expansible-contractible bellows 30, of rubber or thin metal. The flanged open bottom end of the bellows is clamped by a ring 31 to the lower diaphragm member 17, and the head 32 of the bellows is clamped to the upper diaphragm member 21 by the shoulder on stem 27 below the reduced upper end portion of the same which passes through disk 23. There is clearance between stem 27 and the screw 20, and the interior of bellows 30 is therefore in communication with the area below the central portion of the lower diaphragm member 17. Interposed between the spacing rings 24—25 is a centrally-apertured disk 33 which serves to limit upward movement of the lower diaphragm member.

The cupped member 26 is vented to the atmosphere by a fitting 34 and therefore serves mainly as a protecting cover for the upper diaphragm member 21. When the device is employed for the control of gaseous fuel, a pipe (not shown) is usually connected to the fitting 34 and extended to a point where any gas which, due to leakage or rupture of the diaphragm 22, might pass to the interior of the cupped member would be safely discharged.

Mounted on the top surface of the cupped member 26 is a housing 35 which forms a chamber for a three-way pilot valve comprising a pair of jets 36—37 with which a closure blade 38 cooperates. The blade is fulcrumed toward its lower end on the lower arm of a U-shaped electromagnet core 39 and is biased into seating engagement with the jet 36 by a tension spring 40. The blade 38 is of magnetic material and is attracted toward the upper arm of the core, and into seating engagement with jet 37, when the core is energized by passage of current through its coil winding 41. The jet 36 forms one end of a pipe 42 which extends outwardly of housing 35, and through aligned openings in the spacing rings 24—25 and the top wall of casing 11, to the outlet chamber 13. Similarly, the jet 37 forms one end of a pipe 43 which communicates, by a passage 44 through the casing, with the inlet chamber 12. Interconnecting the interior of housing 35 with the pressure chamber 45 defined by the diaphragm members 17 and 21, is another pipe 46.

Assuming that the device is connected in a gas conduit for supplying a burner or a plurality of burners, the parts will be in the positions shown in the drawing; the pilot valve blade 38 being in its released position in engagement with jet 36 and the pressure chamber 45 between the diaphragm members therefore in communication with the inlet 12 through pipe 46, interior of housing 35, open jet 37, and pipe 43. Since approximately equal areas of the opposite sides of the lower diaphragm member 17 are subjected to the inlet pressure, this member rests by gravity on the valve seat 16 and flow to the burners is obstructed. The underside of the upper diaphragm member 21 being subjected to the inlet pressure, and its opposite side to atmosphere, this member is in raised position with the regulator closure 28 in tight engagement with its seat, so that the port opening 15 is closed at both ends.

If the electromagnet core 39 is now energized, the pilot valve blade 38 is attracted out of engagement with jet 36 and into engagement with jet 37, so that the pressure chamber 45 is placed in communication with the outlet 13, through pipe 46, interior of housing 35, open jet 36, and pipe 42. Due to the resultant reduction of gas pressure above the lower diaphragm member 17 (it being assumed that the conduit leading to the burners is unobstructed) this member is forced upwardly, normally into engagement with stop disk 33, by the inlet pressure below it so that the port opening 15 is uncovered. Also, due to the reduction of pressure below the upper diaphragm member 21, that member tends to fall by gravity so that the regulator closure 28 opens to some extent. However, as the gas pressure then rises in the outlet 13 (and in the chamber 45) the diaphragm member 21 is again forced upwardly and assumes a throttling position with respect to its seat as determined by the pressure in the outlet. Any variation of the outlet pressure (caused, for instance, by the turning-off of one or more of the burners) produces corresponding variation of the throttling condition of the regulator closure so that the desired regulation of gas pressure at the burners is effected.

It is to be noted particularly that when the device is in flow-obstructing condition, as shown in the drawing, the regulator closure 28 is seated, so that flow through the device is subsequently initiated by the opening of the regulator closure—rather than by the main closure constituted by the lower diaphragm member. In conventional fluid pressure regulators, in distinction, the closure is in fully-open position when the conduit between it and the fluid source is closed, so that upon initiation of flow there is a sudden surge of fluid through the system before the regulator closure can reach its throttling position.

When the lower diaphragm member is in raised, or port-opening, position, the central area of the underside of the upper diaphragm member, inside of bellows 30, is subjected to the inlet pressure due to the clearance between stem 27 and screw 29. Since this central area of the upper diaphragm member is approximately equal to the area of regulator closure 28 exposed to inlet pressure, variation of inlet pressure does not affect the regulator and it therefore responds solely to the outlet pressure.

When conditions are such that the main closure (lower diaphragm member) is not fully open and therefore effects a substantial pressure drop—as when the inlet pressure is abnormally low—the regulator closure opens wider to compensate for the reduction of outlet pressure. It is thus apparent that any restriction of flow caused by the main closure is compensated for by the regulator closure. It also follows that the weight of the lower diaphragm member, or main closure, can be greater (and thus effect greater seating force) in the device disclosed than in an internally-vented diaphragm valve which lacks the regulator arrangement of the present invention, because of the fact that any extra pressure drop produced by possible closer positioning of the heavier closure above its seat is compensated for by the regulator.

The embodiment of my invention herein shown and described is obviously susceptible of modification without departing from the spirit of the invention, and I intend therefore to be limited only by the scope of the appended claims.

I claim as my invention:

1. In a fluid control device: a casing having a partition dividing it internally to form an inlet and an outlet chamber, said partition having a port opening therethrough interconnecting said chambers; a first flexible diaphragm member closing an opening through a casing wall of said inlet chamber and having a portion forming a first closure cooperable with the inlet end of said port opening and biased theretoward; a second flexible diaphragm member at the side of said first diaphragm member away from said inlet chamber; means defining with said diaphragm members a pressure chamber therebetween; a second closure operatively connected to said second diaphragm member and cooperable with the outlet end of said port opening; and means, including pilot valve means, for fluidly connecting said pressure chamber with said inlet chamber in one position of the pilot valve means, and with said outlet chamber in another position of the pilot valve means; the arrangement of said closures being such that, with decrease of pressure in said pressure chamber, both of the closures tend to open.

2. In a fluid control device: a casing having a partition dividing it internally to form an inlet and an outlet chamber, said partition having a port opening therethrough interconnecting said chambers; a first flexible diaphragm member closing an opening through a casing wall of said inlet chamber and having a portion forming a first closure cooperable with the inlet end of said port opening and biased theretoward; a second flexible diaphragm member exterior of the casing and disposed in a plane substantially parallel to that of the first diaphragm member; means joined to the casing and defining with said diaphragm members a pressure chamber therebetween; a second closure cooperable with the outlet end of said port opening; means operatively connecting said second closure with said second diaphragm member and sealingly extending through an opening in the first diaphragm member; and means, including pilot valve means, for fluidly connecting said pressure chamber with said inlet chamber in one position of the pilot valve means, and with said outlet chamber in another position of the pilot valve means; the arrangement of said closures being such that, with decrease of pressure in said pressure chamber, both of the closures tend to open.

3. In a fluid control device: a casing having a partition dividing it internally to form an inlet and an outlet, said partition having a vertical port opening therethrough interconnecting said inlet and outlet; a first flexible diaphragm member closing an opening through the top wall of the casing at the inlet thereof, a portion of said first diaphragm member forming a first closure normally resting on the inlet end of said port opening under the weight of the diaphragm member; a second diaphragm member overlying the first diaphragm member; means joined to the top wall of the casing and defining with said diaphragm members a pressure chamber therebetween; a second closure cooperable with the outlet end of said port opening; a stem connecting said second closure with said second diaphragm member, said stem extending freely through said port opening and sealingly through an opening in the first diaphragm member; and means, including pilot valve means, for fluidly connecting said pressure chamber with said inlet in one position of the pilot valve means, and with said outlet in another position of the pilot valve means.

4. In a fluid control device: a casing having a partition dividing it internally to form an inlet chamber extending to the top of the casing and an outlet chamber, said partition having an elongated vertical port opening therethrough interconnecting said chambers and providing at the inlet and the outlet ends of the port opening a pair of opposed valve seats; a first flexible diaphragm member closing an opening through the top wall of the casing, a portion of said first diaphragm member forming a first closure normally resting on the inlet one of said valve seats under the weight of the diaphragm member; a second flexible diaphragm member overlying said first diaphragm member; means joined to the top wall of the casing and defining with said diaphragm members a pressure chamber therebetween; said first diaphragm member having an aperture therethrough generally on the axis of said port opening; yieldable means surrounding said aperture and sealingly joining said diaphragm members; a stem extending from said second diaphragm member freely through said aperture and said port opening and carrying at its lower end a second closure engageable with the outlet one of said valve seats; and means, including pilot valve means for fluidly connecting said pressure chamber with said inlet chamber in one position of the pilot valve means, and with said outlet chamber in another position of the pilot valve means.

5. In a fluid control device: a casing having a partition dividing it internally to form an inlet chamber extending to the top of the casing and an outlet chamber, said partition having an elongated vertical port opening therethrough interconnecting said chambers and providing at the inlet and the outlet ends of the port opening a pair of opposed valve seats; a first flexible diaphragm member closing an opening through the top wall of the casing, a portion of said first diaphragm member forming a first closure normally resting on the inlet one of said valve seats under the weight of the diaphragm member; a second flexible diaphragm member overlying said first diaphragm member; means joined to the top wall of the casing and defining with said diaphragm members a pressure chamber therebetween; said first diaphragm member having an aperture therethrough generally on the axis of said port opening; a flexible bellows surrounding said aperture and sealingly joined at its opposite ends to said diaphragm members, the arrangement being such that a substantial area of the underside of said second diaphragm member is in communication, through said aperture, with said inlet chamber when said first closure is raised from its seat; a stem extending from said second diaphragm member freely through said aperture and said port opening and carrying at its lower end a second closure engageable with the outlet one of said valve seats; and means, including pilot valve means, for fluidly connecting said pressure chamber with said inlet chamber in one position of the pilot valve means, and with said outlet chamber in another position of the pilot valve means.

LAURENCE C. BIGGLE.